United States Patent [19]

DeCraene

[11] E Re. 29,419

[45] Reissued Sept. 27, 1977

[54] FINELY DIVIDED $RuO_2$/PLASTIC MATRIX

[75] Inventor: Denis F. DeCraene, Elkridge, Md.

[73] Assignee: Diamond Shamrock Technologies S.A., Geneva, Switzerland

[21] Appl. No.: 667,454

[22] Filed: Mar. 16, 1976

Related U.S. Patent Documents

Reissue of:

[64] Patent No.: 3,798,063
Issued: Mar. 19, 1974
Appl. No.: 203,059
Filed: Nov. 29, 1971

[51] Int. Cl.[2] ..... B44D 1/34; B44D 1/18; C25B 11/08

[52] U.S. Cl. ..... 204/290 F; 204/290 R; 204/129; 252/472; 252/518; 427/126

[58] Field of Search ..... 252/518, 519, 472; 204/290 F, 290 R, 129; 136/120 FC; 427/126, 115

[56] References Cited

U.S. PATENT DOCUMENTS

| | | | |
|---|---|---|---|
| 2,730,597 | 1/1956 | Podolsky | 252/519 |
| 3,336,423 | 8/1967 | LeClair | 136/120 FC |
| 3,553,841 | 1/1971 | Fishman | 136/120 FC |
| 3,615,841 | 10/1971 | Smith | 136/120 FC |
| 3,671,317 | 6/1972 | Rifkin | 427/115 |
| 3,682,840 | 8/1972 | Van Loan | 252/518 |
| 3,687,724 | 8/1972 | Keith | 427/126 |

*Primary Examiner*—Ralph S. Kendall
*Attorney, Agent, or Firm*—Hammond & Littell

[57] ABSTRACT

Finely divided $RuO_2$ serves as an efficient and long-lived electrocatalyst when dispersed in a polymer matrix chemically and mechanically inert to an electrolyte. When applied to a substrate, generally an electrically conductive substrate, an electrode, particularly suited for use as an anode at which oxygen is evolved, is obtained. A coating of polyvinylidene fluoride containing $RuO_2$ having a particle size of less than 0.1 micron on a titanium substrate is exemplary.

11 Claims, No Drawings

FINELY DIVIDED $RuO_2$/PLASTIC MATRIX

Matter enclosed in heavy brackets [ ] appears in the original patent but forms no part of this reissue specification; matter printed in italics indicates the additions made by reissue.

BACKGROUND OF THE INVENTION

In the area of electrochemical reactions, those processes which employ electrodes functioning as "oxygen evolving anodes" are of considerable commercial significance. Examples of such processes include electrowinning, e.g., the aqueous electrowinning of antimony, cadmium, chromium, zinc, copper and the like; water electrolysis, e.g., the evolution of oxgyen in a life support system; aqueous metal plating, cathodic protection in brackish waters, oxygen regeneration in water pollution abatement, organic synthesis and others. An obvious requirement of an anode for use in such processes is a low oxygen overvoltage, "overvoltage" referring to the excess electrical potential over the theoretical reversible potential at which the desired element is discharged at the electrode surface under equilibrium conditions. While a number of materials have been advanced for use as "oxygen anodes," such materials being alleged to have low oxygen overvoltages, these suffer in other ways which limit their application, such as being chemically reactive, lacking dimensional stability, being of excessive cost, being sensitive to impurities in the system and others. Probably the biggest problem, however, even with an electrode having the required low overvoltage, is the short useful lifetime exhibited by such electrodes under commercial operating conditions. That is, while exhibiting an initially low oxygen overvoltage, the operating voltage steadily increases until the anode either fails to pass current completely or does so only at economically unacceptable levels of potential.

STATEMENT OF THE INVENTION

Therefore it is an object of the present invention to provide an electrode particularly useful as an oxygen anode and having a low oxygen overvoltage, chemical stability and a long useful life under commercial operating conditions.

It is a further object of the present invention to provide a coating material for use on an electrically conductive substrate, which coating has the aforesaid advantages.

These and further objects of the present invention will become apparent to those skilled in the art from the specification and claims which follow.

It has now been found that finely divided $RuO_2$ having a particle size of *0.5 to* 0.1 micron or less dispersed in a chemically and mechanically inert organic polymer matrix exhibits a low oxygen overvoltage for a surprisingly long period of time. It has further been found that such a combination of finely divided $RuO_2$ and organic polymer on an electrically conductive substrate provides an efficient electrode for many electrochemical reactions.

DESCRIPTION OF THE PREFERRED EMBODIMENTS

The $RuO_2$ useful in the practice of the present invention is that having a particle size of less than 0.1 micron. *Other particle sizes from 0.5 to 0.1 or less are useful but to a lesser extent.* The criticality of this extremely fine particle size is clearly demonstrated by the specific example which follows. There it is shown that both the oxygen over-voltage and lifetime of an anode employing the finely divided material are dramatically improved, as compared to an even slightly more coarse $RuO_2$.

The method of providing the $RuO_2$ in a finely divided form is critical only in that the requisite particle size be obtained. One such method involves the dissolution of ruthenium trichloride in an acid solution followed by treatment with a base to the alkaline side and finally by acidification to a pH within the range of 6–6.5. The resulting suspension is washed thoroughly with distilled water until free of the salt of neutralization, dried at 100° C. and fired at elevated temperatures, generally not in excess of 500° C. Other methods may be used, provided a relatively clean finely divided $RuO_2$ is obtained. *Other platinum group metal oxides such as oxides of rhodium, palladium, osmium, iridium and platinum may be used.*

The nature of the organic polymer with which the finely divided $RuO_2$ is to be used may vary greatly depending upon the intended application of the electrode. Obviously, since the organic polymer is intended to bind together and provide some mechanical support for the $RuO_2$, as well as to provide adhesion to and protection for any underlying substrate, the polymer itself must exhibit chemical and mechanical resistance to the surrounding environment. For example, where the electrode may be subjected to elevated temperatures, use of a polymer having a high melting or softening point is indicated. In corrosive environments, polymers having good resistance to the chemicals involved will be employed. An electrode of varying susceptibility to wetting by the electrolyte may be obtained by using more or less hydrophobic polymers. Thus it will be seen that many classes of polymers are useful in the present invention. Particularly useful, owing to their relative thermal stability and excellent chemical resistance, are the fluorocarbons such as polyvinyl fluoride, polyvinylidene fluoride, polytetrafluoroethylene, polyhexafluoroethylene and polychlorotrifluoroethylene. Also useful are the various acrylics, such as polymethyl methacrylate; phenolics, such as phenolformaldehyde; polyethylene; polystyrene; polyacrylonitrile; acrylonitrile-vinyl chloride copolymer; polyvinylidene chloride; polyesters; polyimides; polymercaptans; polysulfones; polycarbonates and the like.

The amount of $RuO_2$ *or other platinum group metal oxide* used per part by weight of polymer varies with the application intended and the properties desired but generally is within the range of 6–1:1. In most instances the $RuO_2$/polymer composition will be used as a coating on a substrate, in which case the amount of coating applied per square foot of substrate will likewise vary with the intended application and also with the $RuO_2$:polymer weight ratio. Obviously, since $RuO_2$ adds electrical conductivity and catalytic properties, the higher the weight ratio the more conductive the resultant coating. Therefore thicker coatings may be applied of the lower resistance, high $RuO_2$ content coating.

The composition of the present invention may be applied to a number of substrates depending upon the use to which the resulting electrode is to be put. For example, if the $RuO_2$ content of the coating is high, the conductivity of the coating will be such that the substrate itself need not be conductive, the coating serving as the sole vehicle for the conduction of current. In such instances inert materials, e.g., ceramic, will be quite useful as substrates since their only function is to provide mechanical support for the coating. In most instances, however, where high current levels are employed it will be desirable and convenient to use an electrically conductive substrate. Preferably such a substrate will be inert to the electrolyte and products of the electrolysis. Examples of such substrates are nickel, steel, the valve metals (titanium, tantalum, zirconium and niobium), lead, lead-antimony alloys, lead-thallium alloys and the like.

The physical form of the substrate, which in most instances determines the structure of the resulting electrode, may vary widely. While solid sheets, rods and the like are useful in many instances, often preferred is a mesh or expanded metal configuration. Such a substrate insures good coating adhesion and uniform current distribution.

The method of preparation of the desired electrodes is not critical to the present invention. Any of the known techniques for causing a mixture of a polymeric material with a filler (in this case the $RuO_2$) to solidify, especially on a substrate, are useful. One such technique involves the preparation of a codispersion of the polymeric material and the $RuO_2$, generally in a liquid medium to facilitate mixing and application, after which the dispersion is applied to the substrate being used, e.g. by dip-coating or brushing. Subsequently the coated structure is heated, to flash off the liquid and cause some melt-flowing to occur, then cooled to yield the final electrode. An alternate and somewhat preferred technique involves the preparation of a relatively viscous paint-type formulation containing from 20–45 percent dissolved polymeric material plus disposed $RuO_2$ *or other Pt group metal oxide conductive filler* in a liquid organic vehicle. A substrate, especially a mesh substrate, may then be coated with the "paint," for example by dipping into the solution, with curing, at temperatures on the order of 500° F. for 3–20 minutes to evaporate the vehicle and solidify the coating, between any number of successive layers, e.g., 1–5.

In view of the excellent electrical and electrolytic characterisitics of the electrodes of the present invention, the areas in which they will find use will be limited primarily by mechanical considerations. Most important of these considerations is that the use of the electrode not be in an environment in which it may be expected that temperatures substantially exceeding the softening point of the polymer used in the coating will be experienced since deformation and attrition may then be expected. The aforementioned electrical and electrolytic properties suggest use in a variety of fields, for example:

1. as anodes in electrowinning of various metals, where oxygen is the primary anode reaction product;
2. as oxygen-evolving anodes in water electrolysis systems for life support applications;
3. as anodes in electroplating systems, where nonexpandable anodes with good stability and low oxygen evolution potential are desirable;
4. as anodes for cathodic protection in brackish water, where stability toward oxygen evolution is also required and,
5. as electrodes in electro-organic synthesis, where oxygen-evolving characteristics are desirable.

In order that those skilled in the art may more readily understand the present invention, the following specific example is afforded.

EXAMPLE

Finely divided $RuO_2$ is prepared by dissolving $RuCl_3$ in 1.5M HCl (aqueous) solution to the extent of 150 grams per liter. Said solution is treated with NaOH (20 percent by weight) until just alkaline then acidified with HCl to a pH within the range of 6.0–6.5. The resultant suspension is washed twice by decantation with distilled water followed by filtration on a Buchner funnel with additional (hot) water wash until the hydrated oxide is free of NaCl. Finally the oxide is thoroughly dried at a temperature of about 110° C. *and fired at elevated temperatures generally not in excess of 500° C.* The particle size of substantially all of the resultant $RuO_2$ is determined to be less than 0.1 micron, particles as small as 300 Angstroms being noted.

For comparison, $RuO_2$ is also prepared by heating $RuCl_3$ powder in an oxidizing atmosphere at a temperature of 450° C. until complete conversion is obtained. The particle size of the resultant $RuO_2$ is determined to be greater than 0.5 micron and is labeled "coarse."

For further comparison $RuO_2$ is prepared by extensive ball milling of $RuCl_3$ powder followed by screening through a 100 mesh sieve and firing in an oxidizing atmosphere at 450° C. as above. The resultant $RuO_2$ is determined to have a particle size within the range of 0.2–0.5 micron and is designated "medium."

Test electrodes are fabricated employing each of the above by coating onto an oxide-free titanium metal sheet as follows. Four parts *by weight* of the $RuO_2$ is mixed with one part *by weight* of polyvinylidene fluoride. The mixture is then dispersed at a solids level of 40 percent in 1-methyl-2-pyrrolidinone. The titanium is coated by brushing the dispersion onto the substrate followed by curing 10 minutes at 500° F. The resultant electrodes are employed as the anodes in 1M $H_2SO_4$ at room temperature and an anode current density of 3 amperes per square inch. Results appear in the following table. Potential is measured versus the standard calomel electrode and an anode's lifetime is considered terminated when the voltage exceeds 3.0 V.

TABLE

| Electrode ($RuO_2$) Designation | $RuO_2$ Particle Size $\mu$ | Initial Half Cell Potential (Volts) | Lifetime (Hrs.) |
|---|---|---|---|
| Coarse | >0.5 | 1.38 | 1-2 |
| Medium | [0.5-02.]*0.5-0.2* | 1.33 | 26.5 |
| Fine | <0.1 | 1.31 | 228 |

From the Table is becomes apparent that not only is a substantial voltage advantage obtained through the use of the finely divided $RuO_2$ of the present invention but, most importantly, the lifetime of the anode is extended to a remarkable and unexpected degree.

While the invention has been described by reference to certain preferred embodiments by which it may be carried into effect, it is not to be so limited since changes and alterations may be made therein as is apparent from the scope of the appended claims.

I claim:

1. A coating for use in electrolytic applications which coating consists essentially of a solidified intimate mixture of a substantially chemically and mechanically inert organic polymer and a $RuO_2$ electrocatalyst having a particle size of less than 0.1 micron.

2. An electrode for use in electrolytic processes which electrode consists essentially of a supporting substrate having a coating on at least a portion of the surface thereof which coating consists essentially of a solidified intimate mixture of a substantially chemically and mechanically inert organic polymer and a $RuO_2$ electrocatalyst having a particle size of less than 0.1 micron.

3. An electrode as in claim 2 wherein the organic polymer is a fluorocarbon polymer.

4. An electrode as in claim 3 wherein the fluorocarbon polymer is polyvinylidene fluoride.

5. An electrode as in claim 2 wherein the weight ratio of $RuO_2$:polymer is 6–1:1.

6. An electrode for use in electrolytic processes which electrode consists essentially of an electrically conductive supporting substrate having a coating on at least a portion of the surface thereof which coating consists essentially of a solidified intimate mixture of a substantially chemically and mechanically inert organic polymer and a $RuO_2$ electrocatalyst having a particle size of less than 0.1 micron.

7. An electrode as in claim 6 wherein the electrically conductive substrate is selected from the group consisting of nickel, steel, titanium, tantalum, zirconium, niobium, lead, lead-antimony alloys and lead-thallium alloys.

8. An anode for use in electrolytic processes wherein oxygen is generated as the anode, which anode consists essentially of, a. a supporting substrate selected from the group consisting of nickel, steel, titanium, tantalum, zirconium, niobium, lead, lead-antimony alloys and lead-thallium alloys, and b. a coating consisting essentially of a solidified intimate mixture of a fluorocarbon polymer and a $RuO_2$ electrocatalyst having a particle size of less than 0.1 micron, the weight ratio of $RuO_2$:polymer being from 6–1:1.

9. An anode as in claim 8 wherein the polymer is polyvinylidene fluoride.

*10. An electrocatalytic material consisting essentially of a solidified intimate mixture of a substantially chemically and mechanically inert organic polymer and an electrocatalyst of finely divided $RuO_2$ having a particle size of less than 0.5 microns.*

*11. An electrocatalytic material consisting essentially of a solidified intimate mixture of a substantially chemically and mechanically inert organic polymer and an electrocatalyst of $RuO_2$ having a particle size of approximately 0.1 to approximately 0.5 microns.*

* * * * *